(12) United States Patent
Kuang et al.

(10) Patent No.: US 8,535,201 B2
(45) Date of Patent: Sep. 17, 2013

(54) METHOD AND STRATEGY TO DETECT THE LOCK-UP OF PLANETARY GEAR IN POWER SPLIT HYBRID VEHICLES

(75) Inventors: Ming Lang Kuang, Canton, MI (US); Shailesh Shrikant Kozarekar, Novi, MI (US); Fazal Urrahman Syed, Canton, MI (US); Edward William Haran, Northville, MI (US); Jonathan Andrew Butcher, Farmington, MI (US); Kimberly Murphy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/242,691

(22) Filed: Sep. 23, 2011

(65) Prior Publication Data

US 2012/0053010 A1   Mar. 1, 2012

Related U.S. Application Data

(60) Provisional application No. 61/388,248, filed on Sep. 30, 2010.

(51) Int. Cl.
*B60K 1/02* (2006.01)
*H02P 1/00* (2006.01)
*H02P 3/00* (2006.01)
*H02P 7/00* (2006.01)
*B60W 10/06* (2006.01)
*B60W 20/00* (2006.01)
*B60W 10/04* (2006.01)

(52) U.S. Cl.
USPC ............ 477/3; 477/7; 180/65.28; 180/65.285

(58) Field of Classification Search
USPC ................ 477/3, 7; 180/65.1–65.265, 65.28, 180/65.285, 65.31
See application file for complete search history.

(56) References Cited

U.S. PATENT DOCUMENTS

| | | | |
|---|---|---|---|
| 3,565,202 A | 2/1971 | Evans et al. | |
| 3,757,130 A * | 9/1973 | Uchiyama et al. | 290/40 R |
| 6,196,189 B1 | 3/2001 | Baldwin et al. | |
| 6,405,818 B1 * | 6/2002 | Anthony et al. | 180/65.8 |
| 6,512,967 B2 | 1/2003 | Ostberg et al. | |
| 6,991,053 B2 | 1/2006 | Kuang et al. | |
| 7,228,209 B2 | 6/2007 | Izawa et al. | |
| 7,254,472 B2 | 8/2007 | Larsen et al. | |

(Continued)

FOREIGN PATENT DOCUMENTS

| | | |
|---|---|---|
| EP | 1316459 A1 | 4/2003 |
| JP | 2011140247 A * | 7/2011 |

*Primary Examiner* — Tisha Lewis
(74) *Attorney, Agent, or Firm* — David B. Kelley; Brooks Kushman P.C.

(57) ABSTRACT

A system and method for controlling a hybrid electric vehicle powertrain having an engine, a generator, and a motor connected via a planetary gear set to detect lockup in the planetary gear set and control the powertrain in response. When torque is distributed in an electric mode of operation with the engine disabled, the generator is disabled based at least upon a difference between actual generator speed and an expected generator speed exceeding a threshold, indicating a lockup in the planetary gear set. When the engine is activated and distributes torque through the powertrain, the engine and the generator are disabled based at least upon a difference between engine acceleration and an expected engine acceleration exceeding a first threshold, and a difference between engine speed and ring gear speed being less than a second threshold.

13 Claims, 3 Drawing Sheets

(56) References Cited

U.S. PATENT DOCUMENTS

| | | |
|---|---|---|
| 7,605,494 B2 | 10/2009 | Jabaji et al. |
| 7,771,310 B2 | 8/2010 | Tanishima |
| 8,280,571 B2 * | 10/2012 | Sakata .................... 701/22 |
| 2003/0136597 A1 | 7/2003 | Raftari et al. |
| 2006/0174629 A1 | 8/2006 | Michalko |
| 2007/0078040 A1 | 4/2007 | Nobumoto et al. |
| 2007/0229021 A1 | 10/2007 | Yoshida et al. |
| 2008/0097684 A1 * | 4/2008 | Syed et al. .................... 701/106 |
| 2008/0257310 A1 | 10/2008 | Theobald et al. |
| 2008/0257619 A1 | 10/2008 | Yamazaki |
| 2009/0076693 A1 | 3/2009 | Kumazaki et al. |
| 2009/0187298 A1 * | 7/2009 | Cuppetilli et al. ............. 701/22 |
| 2009/0320461 A1 * | 12/2009 | Morinaga et al. ............... 60/431 |

* cited by examiner

METHOD AND STRATEGY TO DETECT THE LOCK-UP OF PLANETARY GEAR IN POWER SPLIT HYBRID VEHICLES

CROSS-REFERENCE TO RELATED APPLICATIONS

This application claims the benefit of U.S. provisional Application No. 61/388,248 filed Sep. 30, 2010, the disclosure of which is incorporated in its entirety by reference herein.

TECHNICAL FIELD

The present disclosure relates to a vehicle and a control system for controlling the vehicle.

BACKGROUND

In a hybrid electric vehicle (HEV), either or both of an internal combustion engine and an electric motor are capable of supplying power to the wheels of the vehicle. Many HEV's also include planetary gear sets. For example, in a power-split hybrid vehicle, a planetary gear set is coupled to the engine and to a generator that generates power for an electric motor and battery. The planetary gear set may include a sun gear, a ring gear, and planet gears within a planetary carrier. Torque is delivered from the engine through the planetary gear set when any two of the three components lock together ("lockup"). Unintentional lockup may occur in which components of the planetary gear set lockup at undesired times. This may provide an unintentional boost in torque to the wheels from the engine. There is currently a need to effectively detect a lockup in the planetary gear set. There is also a need to mitigate the lockup condition and prevent over delivery of torque at the wheels of the vehicle.

SUMMARY

In one embodiment, a method for controlling a hybrid vehicle is provided. The vehicle has an engine and a traction motor coupled to a driveline. The driveline includes a planetary gear set with a ring gear. A generator is coupled to the planetary gear set and electrically connected to the traction motor. The generator is disabled based at least upon a difference between engine acceleration and an expected engine acceleration exceeding a first threshold. The generator is disabled further based upon a difference between engine speed and ring gear speed being less than a second threshold. The comparison between these differences and their respective thresholds indicates a lockup in the planetary gear set. The generator may be disabled by applying a voltage to a rotor that is out of phase with magnets on the rotor in the generator. Alternatively, or in combination, the generator may be disabled by opening switches that control electric flow and power distribution to the generator. The engine may be disabled instead of or along with the generator when a lockup in the planetary gear set is detected. The engine and/or the generator may be disabled further based at least upon a difference between the engine speed and a target engine speed exceeding a third threshold, and generator torque exceeding a fourth threshold.

In another embodiment, a method for controlling a hybrid vehicle having an engine, traction motor, and a generator is provided. The generator is selectively coupled to traction wheels by a gear set. Torque is distributed in an electric mode of operation, wherein the engine is prevented from powering the traction wheels. The generator is disabled based at least upon a difference between actual generator speed and an expected generator speed exceeding a threshold.

In yet another embodiment, a system for controlling a powertrain of a vehicle is provided. The system comprises an engine and a planetary gear set coupled to the engine. The planetary gear set has a ring gear, and distributes torque to traction wheels in a first mode of operation. A generator is coupled to the planetary gear set. A traction motor is electrically connected to the generator. The motor provides power to the traction wheels in a second mode of operation in which the engine is disabled. A system controller selectively disables the engine and/or generator in the first and second modes of operation. In the first mode of operation, if the engine acceleration is greater than an expected engine acceleration, and a difference between the engine speed and ring gear speed is less than a first threshold, the engine and/or generator is disabled. In the second mode of operation, if a difference between generator speed and an expected generator speed exceeds a second threshold, the engine and/or generator is disabled.

Embodiments according to the present disclosure may provide various advantages. For example, lockup detection according to various embodiments of the present disclosure may be used under a wider range of operating conditions than some previous detection strategies that were limited to vehicle speeds above a certain threshold, or when the vehicle is parked. Detection of lockup and controlling the engine and/or generator in response according to various embodiments of the present disclosure reduce or prevent over delivery of torque at the vehicle wheels. Effectively monitoring lockup may also reduce or prevent drag and vibration when the vehicle is operated in EV mode and increase overall operating efficiency of the vehicle.

The above advantages and other advantages and features will be readily apparent from the following detailed description of the preferred embodiments when taken in connection with the accompanying drawings

DETAILED DESCRIPTION

Detailed embodiments of the present invention are disclosed herein. It is to be understood that the disclosed embodiments are merely exemplary of the invention that may be embodied in various and alternative forms. The figures are not necessarily to scale; some features may be exaggerated or minimized to show details of particular components. Specific structural and functional details disclosed herein are therefore not to be interpreted as limiting, but merely as a representative basis for teaching one skilled in the art to variously employ the present invention. As those of ordinary skill in the art will understand, various features of the embodiments illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to systems or methods for detecting planetary gear set lockup in a power-split hybrid electric vehicle. However, the teachings of the present disclosure may also be used in other applications. Those of ordinary skill in the art may recognize similar applications or implementations with other vehicle configurations or technologies.

Figure 1:
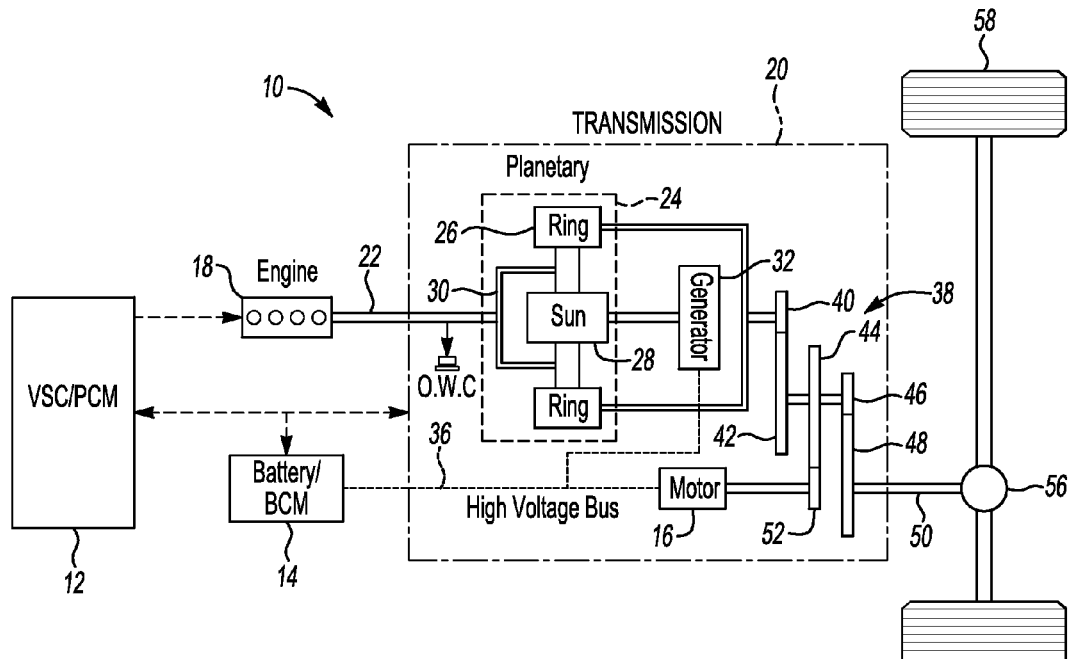
FIG. 1 is a schematic representation of a power-split powertrain system with lockup detection according to embodiments of the present disclosure.

Referring to FIG. 1, a hybrid electric vehicle (HEV) includes a power-split powertrain 10. A vehicle system controller (VSC) and powertrain control module (PCM) 12 control an electric traction battery 14. The battery 14 has a two-way electrical connection, whereby it receives and stores electric energy and also supplies the energy to an electric traction motor 16. The controller 12 also controls the operation of an internal combustion engine (ICE) 18. Both the motor 16 and the engine 18 are capable of powering a transmission 20 that ultimately delivers torque to the wheels of the vehicle.

The engine 18 delivers power to a torque input shaft 22 that is connected to a planetary gear set 24 through a one way clutch. The input shaft 22 powers the planetary gear set 24 that includes a ring gear 26, a sun gear 28, and a planetary carrier assembly 30. The input shaft 22 is driveably connected to the carrier assembly 30 to power the planetary gear set 24. The sun gear 28 is driveably connected to a generator 32. The generator 32 may be engaged with the sun gear 28, such that the generator 32 may either rotate with the sun gear 28, or not rotate with it. When the one way clutch couples the engine 18 to the planetary gear set 24, the generator 32 generates energy as a reactionary element to the operation of the planetary gear set 24. Electric energy generated from the generator 32 is transferred to the battery 14 through electrical connections 36. The battery 14 also receives and stores electric energy through regenerative braking, in known fashion. The battery 14 supplies the stored electric energy to the motor 16 for operation. The portion of the power delivered from the engine 18 to the generator 32 may also be transmitted directly to the motor 16. The battery 14, motor 16, and generator 32 are each interconnected in a two-way electric flow path through electrical connections 36.

The vehicle may be powered by the engine 18 alone, by the battery 14 and motor 16 alone, or by a combination of the engine 18 with the battery 14 and motor 16. In a first mode of operation, the engine 18 is activated to deliver torque through the planetary gear set 24. The ring gear 26 distributes torque to step ratio gears 38 comprising meshing gear elements 40, 42, 44, and 46. Gears 42, 44, and 46 are mounted on a countershaft, and gear 46 distributes torque to gear 48. Gear 48 then distributes torque to a torque output shaft 50. In the first mode of operation, the motor 16 may also be activated to assist in the engine 18. When the motor 16 is active in assisting, gear 52 distributes torque to gear 44 and to the countershaft. In a second mode of operation, or EV mode, the engine 18 is disabled or otherwise prevented from distributing torque to the torque output shaft 50. In the second mode of operation, the battery 14 powers the motor 16 to distribute torque through the step ratio gears 38 and to the torque output shaft 50. The torque output shaft 50 is connected to a differential and axle mechanism 56 which distributes torque to traction wheels 58. The controller 12 controls the battery 14, engine 18, motor 16 and generator 32 in order to distribute torque to the wheels 58 in either the first mode of operation or the second mode of operation.

As previously described, there are two power sources for the driveline. The first power source is the engine 18, which delivers torque to the planetary gear set 24. The other power source involves only the electric drive system, which includes the motor 16, the generator 32 and the battery 14, where the battery 14 acts as an energy storage medium for the generator 32 and the motor 16. The generator 32 may be driven by the planetary gear set 24, and may alternatively act as a motor and deliver power to the planetary gear set 24.

The controller 12 receives information from sensors (not shown) such that the controller 12 can monitor speeds ω of the motor 16, engine 18 and/or generator 32. Of course, one or more speeds may be determined, inferred, or calculated based on known relationships and/or ratios among the various components. In addition, corresponding torques τ of the motor 16, generator 32, ring gear 26, sun gear 28, carrier assembly 30 and drive shaft 50 may be calculated, measured, or otherwise determined using any of a number of known techniques. Under normal operating conditions, and assuming the motor 16 and generator 32 deliver the requested torque, the actual driveshaft torque at the wheels may be represented as follows:

$$\tau_{driveshaft\_actual} = \tau_{driveshaft\_command} - \frac{T_g}{T_2} \times J_{mot\_lumped} \times \frac{d\omega_{mot}}{dt} \quad (1)$$

where $J_{mot\_lumped}$ is the lumped moment of inertia of a rotor of the motor, the ring gear, and all the gears, represented by:

$$J_{mot\_lumped} = \quad (2)$$

$$J_{mot\&N1} + T_{mot2ring}^2 \times J_{ring\&N3} + T_2^2 \times J_{N2\&N4} + \left(\frac{T_2}{T_g}\right)^2 \times J_{N5}$$

However, when a lockup in the planetary gear set 24 occurs and is not detected, the actual wheel torque may vary from the commanded wheel torque. A lockup occurs when certain relative speeds of the ring gear 26, sun gear 28 and planetary carrier assembly 30 cause the gears to mesh and "lock up," thus transmitting torque from the engine 18 to the transmission 20. This may ultimately result in unwanted torque (positive or negative direction) at the wheels 58 due to added input of torque from the engine 18. This may also cause unwanted drag, as a lockup in the planetary gear set 24 in EV mode will cause a driver of the vehicle to experience drag from the powertrain 10 and vibration in the engine 18 as the engine 18 is spun as a frictional load. Unwanted boost of torque could occur the next time the controller 12 commands the engine 18 to start. When the planetary gear set 24 is locked up and the lockup is not detected, the actual wheel torque may be represented as follows:

$$\tau_{driveshaft\_actual} = \tau_{driveshaft\_command} + \frac{T_g}{T_2} \times \quad (3)$$

$$\left\{ \left[ \left(T_1 \times T_2 \times \left(1 + \frac{1}{\rho}\right) \times \tau_{gen}\right) + T_1 \times T_2 \times \tau_{gen} \right] - \right.$$

$$\left[ J_{mot\_lumped} + (T_1 \times T_2)^2 (J_{eng\&carrier} + J_{gen\&sun}) - \right.$$

$$\left. (T_1 \times T_2)^2 \times \frac{1}{\rho} \times J_{gen\&sun} \right] \frac{d\omega_{mot}}{dt} \right\}$$

The actual wheel torque is greater than the driver commanded torque because of the undetected lockup in the planetary gear set 24 and the additional terms $$\left[\left(T_1 \times T_2 \times \left(1+\frac{1}{\rho}\right) \times \tau_{gen}\right) + T_1 \times T_2 \times \tau_{gen}\right]$$

included in equation (3), where $T_1$ is the gear ratio from the countershaft to the ring gear shaft, $T_2$ is the gear ratio from the motor shaft to the countershaft, $T_g$ is the gear ratio from the drive shaft to the counter shaft, and $\rho$ is the gear ratio from the engine to the generator.

To reduce or eliminate the over delivery of torque, various embodiments according to the present disclosure monitor and detect planetary gear set lockup. Effectively monitoring lockup may also help prevent drag and vibration when the vehicle is operated in EV mode. Detection of lockup according to various embodiments of the present disclosure also facilitates monitoring and detection as the vehicle is operated in any one of multiple operating modes.

Figure 3:
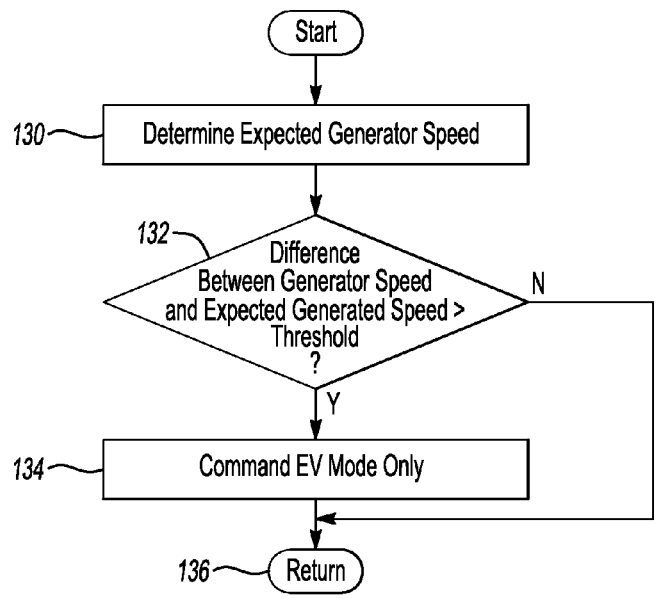
FIG. 3 is a flow chart illustrating operation of a system or method for detecting and mitigating a lockup in a planetary gear set of a vehicle while the vehicle is driven in an electric mode according to various embodiments of the present disclosure.
Figure 2:
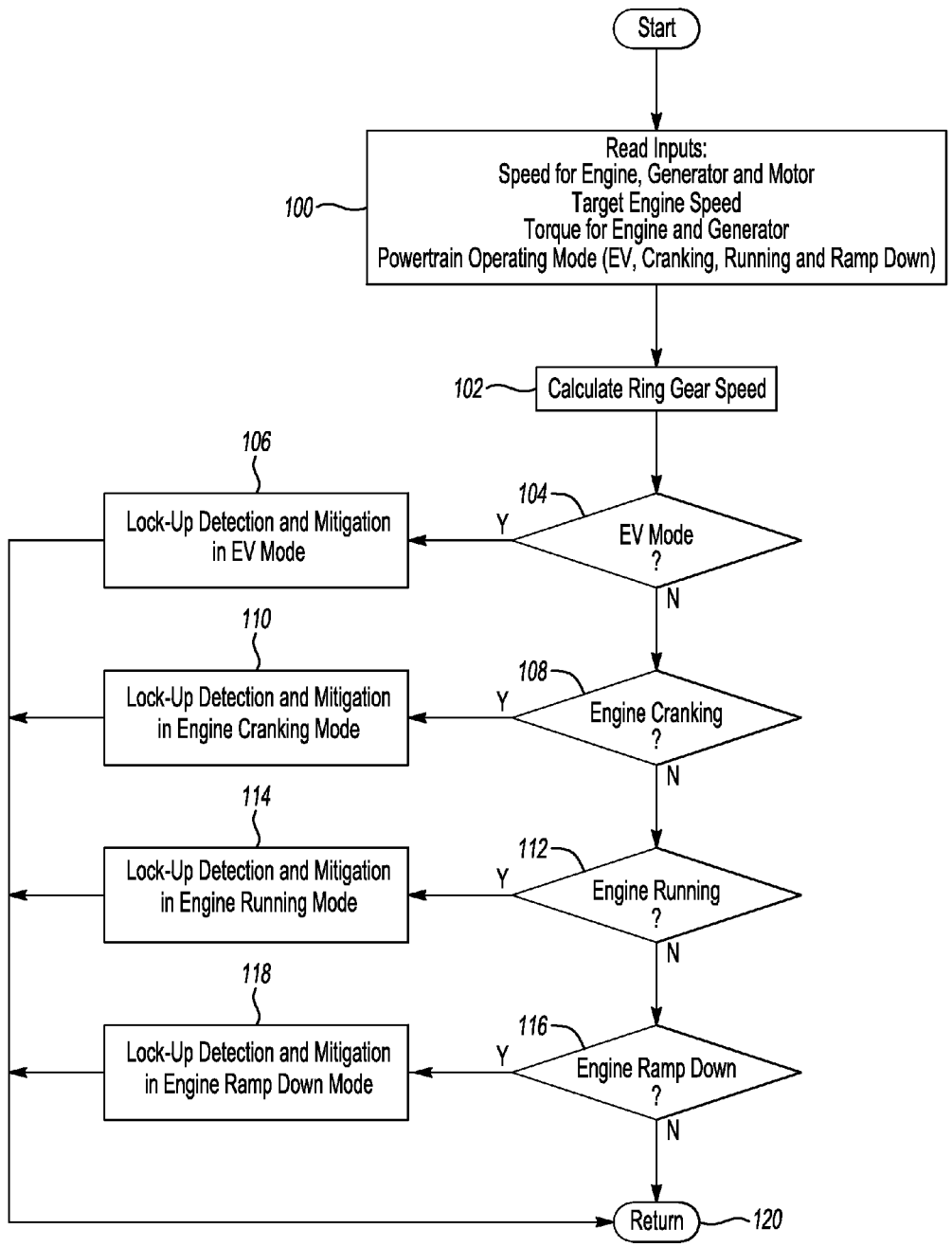
FIG. 2 is a flow chart illustrating operation of a system or method for detecting and mitigating a lockup in a planetary gear set in multiple modes of vehicle operation according to various embodiments of the present disclosure.
Figure 4:
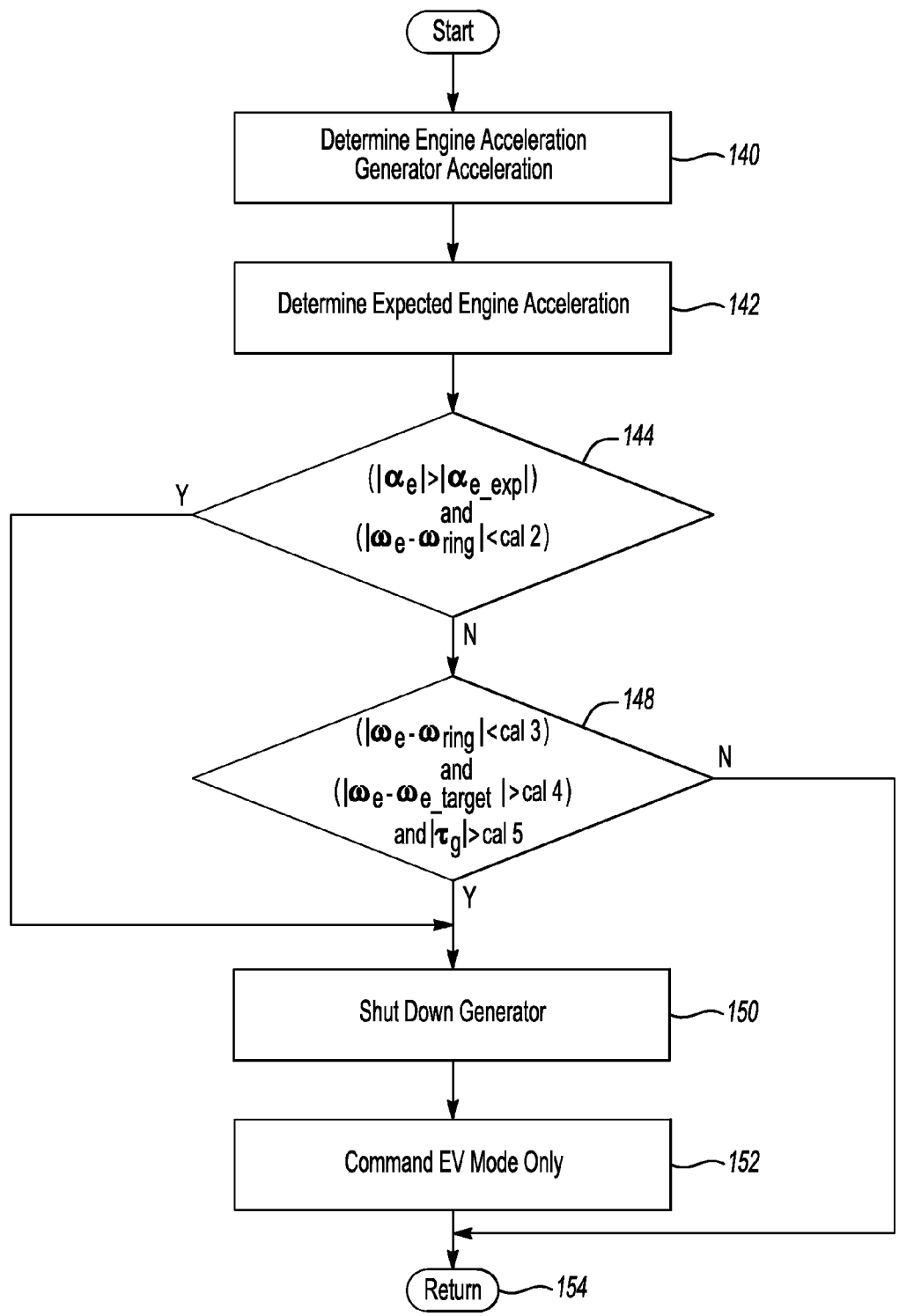
FIG. 4 is a flow chart illustrating operation of a system or method for detecting and mitigating a lockup in a planetary gear set of a vehicle while the vehicle is at least partially driven by an engine according to various embodiments of the present disclosure.

FIGS. 2-4 provide flow charts illustrating operation of a system or method for detecting lockup and controlling a vehicle according to the present disclosure. As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in the Figures, or may be omitted. Similarly, one or more steps or functions may be repeatedly performed, although not explicitly illustrated. In one embodiment, the functions illustrated are primarily implemented by software, instructions, or code stored in a computer readable storage medium and executed by a microprocessor-based computer or controller to control operation of the vehicle. It should further be understood that the controller 12 can be a single vehicle system controller, or a combination of a separate engine control module, motor controller, generator controller, and/or battery controller.

Referring to FIG. 2, a flowchart illustrating operation of a system or method for the detection and mitigation of planetary gear lockup in various modes of operation is shown. Sensors (not shown) sense and communicate information to the controller 12. Depending on the particular application and implementation, controller 12 may calculate, infer, or otherwise determine various vehicle operating parameters from one or more sensors. At step 100, current operating speeds of the engine, generator, and motor are detected or determined. A target engine speed is computed based on accelerator pedal position, available power in the motor, battery state of charge, and other factors known in the art. A corresponding torque of the engine and the generator is also determined. The current operating mode of the powertrain is also determined. Representative operating modes may include an engine cranking mode, an engine running mode, an engine ramp-down mode, and an electric-only (EV) mode in which the engine is disabled and the vehicle is powered by the electric battery and motor only, for example. After these determinations, the speed of the ring gear 26 of the planetary gear set 24 is determined at 102. Various lockup detection and mitigation methods may be implemented based upon the mode of operation of the vehicle and the ring gear speed.

At 104, it is determined if the vehicle is operating in EV mode. When operating in EV mode, lockup detection and mitigation is implemented at 106. If the vehicle is not operating in EV mode, a determination is made as to whether or not the engine is cranking at 108, and if so, the lockup detection and mitigation for the engine cranking mode is implemented at 110. If the vehicle is not operating in an engine cranking mode, it is determined if the vehicle is running in an engine running mode at 112, and if so, the lockup detection and mitigation for the engine running mode is implemented at 114. At 116, it is determined whether or not the vehicle is running in an engine ramp down mode, and if so the lockup detection and mitigation for the ramp down mode is implemented at 118. The process ends at 120 and repeats in its entirety throughout vehicle operation such that the controller constantly determines if there is a lockup in the planetary gear set, and mitigates the lockup depending on the mode of operation of the vehicle.

Referring to FIG. 3, a system for detecting lockup in the planetary gear set 24 while the vehicle is operated in the EV mode is illustrated. In the EV mode, the engine 18 is disabled and the battery 14 and motor 16 electrically power the traction wheels 58 without assist from the engine 18. To detect planetary gear lockup in the EV mode, an expected generator speed is determined at 130. The speed of the generator 32 is related to the speed of the ring gear 26 based on the planetary gear ratio. In particular, the expected generator speed may be determined as follows:

$$\omega_{g\_exp} = \frac{-\omega_{ring}}{\rho} \quad (4)$$

where $\rho$ is the planetary gear ratio between the sun gear 28 and the ring gear 26.

Based on the expected generator speed, lockup may be detected at 132. If the difference between the actual generator speed and the expected generator speed is greater than a calibration or threshold, then conditions are present for the existence of a lockup in the planetary gear set 24. If lockup is detected, then at step 134 the controller 12 commands an operation of EV mode only, in which the generator 32 is disabled. The control system then returns at 136 to assure a constant detection and mitigation method throughout operation of the vehicle in EV mode.

The generator 32 may be disabled in varying fashions. For example, a voltage may be applied from the battery 14 that is out of phase with magnets within the generator 32. This essentially cancels some of the magnetic field in a process known as field weakening. Field weakening is preferably used to "actively" disable the generator at higher vehicle speeds when operating in EV mode, whereas a "passive" disablement is preferably used at lower vehicle speeds. In a passive disablement of the generator, switches in an inverter connected to the generator 32 may be opened to prevent electrical powering of the generator 32. It should be understood that while the engine 18 is disabled throughout an EV mode of operation, the controller 12 may send a further signal to command the engine 18 to disable in case the engine 18 is in fact operating in error. Disabling of the engine 18 may occur as a result of the controller 12 preventing fuel from entering combustion chambers of the engine 18.

Referring to FIG. 4, a flowchart illustrating operation of a system or method for detecting and mitigating planetary gear lockup according to various embodiments of the present disclosure is shown. This strategy may be used for non-EV modes of operation, e.g., engine cranking mode, engine running mode, and engine ramp down mode. Sensors within the vehicle communicate with the controller 12 to determine engine acceleration ($a_e$) and generator acceleration ($a_g$) at 140. An expected engine acceleration ($a_{e\_exp}$) is calculated at 142 using the acceleration of the generator, as follows:

$$a_{e\_exp} = \frac{1}{J_{eng\&carrier}(T_{eng2gen}(\tau_g + J_{gen\&sun} * a_g))} \quad (5)$$

where $J_{eng\&carrier}$ is the combined moment of inertia of the engine 18 and the carrier assembly 30, $T_{eng2gen}$ is the gear ratio between the engine and the generator through the planetary gear set, $\tau_g$ is the generator torque, and $J_{gen\&sun}$ is the combined moment of inertia of the generator 32 and the sun gear 28. If the vehicle is operating in the engine running mode with the engine 18 providing torque to the wheels 58, the expected engine acceleration may be calculated as follows:

$$a_{e\_exp} = \frac{1}{J_{eng\&carrier}(\tau_e + T_{eng2gen}(\tau_g + J_{gen\&sun} * a_g))} \quad (6)$$

where $\tau_e$ is the torque of the engine.

The lockup detection continues at 144, in which a comparison is made between the engine acceleration and the expected engine comparison. In particular, a comparison is made between the absolute value of the engine acceleration and the absolute value of the expected engine acceleration being greater than a first calibration or threshold ($|a_e|-|a_{e\_exp}|>$cal1), or the engine acceleration being greater than the expected engine acceleration ($|a_e|>|a_{e\_exp}|$). A comparison is made between the engine speed and ring gear speed is also made. The absolute value of the difference between the engine speed and the ring gear speed being less than a second threshold ($|\omega_e-\omega_{ring}|<$cal2), in combination with the acceleration of the engine comparison, indicates that a lockup is present in the gear set. If this step results in "no" then the control system continues to step 148, otherwise the control system continues to step 150. At step 148, a ring speed and engine speed comparison is made similar to step 144. Furthermore, if the difference between engine speed and a desired engine speed exceeds a fourth threshold ($|\omega_e-\omega_{e\_target}|>$cal4), and the torque of the generator exceeds a fifth threshold ($|\tau_g|>$cal5), a lockup is present in the gear set. At step 148, it should be understood that instead of using an absolute value in the engine speed comparison or the torque comparison, the comparisons may be split and compared to a negative threshold or a positive threshold, depending on whether the engine is spinning faster or slower than desired. If a lockup is detected either from step 144 or step 148, the generator is disabled at 150 by methods described previously. At 152, the controller 12 commands an EV operation only, in which the engine 18 is disabled by methods described previously. This allows the wheels 58 of the vehicle to be powered by the battery 14 and motor 16 without the assist from the engine 18, thus preventing any boost in torque from the engine 18 because of the lockup in the planetary gear set 24.

As illustrated and described above, embodiments according to the present disclosure may provide various advantages related to planetary gear set lockup detection including more robust detection under a wider range of operating conditions, such as when operating at low vehicle speeds or when the vehicle is parked, for example. Detection of lockup and controlling the engine and/or generator in response according to various embodiments of the present disclosure reduce or prevent over delivery of torque at the vehicle wheels. Effectively monitoring lockup may also reduce or prevent drag and vibration when the vehicle is operated in EV mode and increase overall operating efficiency of the vehicle.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications.

What is claimed is:

1. A method for controlling a hybrid vehicle having an engine and a fraction motor coupled to a driveline including a generator and a planetary gear set with a ring gear, comprising:
    disabling the generator based at least upon:
        a difference between engine acceleration and expected engine acceleration exceeding a first threshold, and
        a difference between engine speed and ring gear speed being less than a second threshold, indicating a lockup in the planetary gear set.

2. The method of claim 1, wherein the generator is coupled to the planetary gear set and electrically connected to the traction motor, the method further comprising disabling the engine when the lockup in the planetary gear set is indicated.

3. The method of claim 1, wherein disabling the generator includes disabling the generator based at least upon:
    a difference between the engine speed and a target engine speed exceeding a third threshold, and
    generator torque exceeding a fourth threshold.

4. The method of claim 1, further comprising delivering torque from the traction motor to vehicle wheels upon the disabling of the generator.

5. The method of claim 1, wherein disabling the generator includes applying a voltage to a rotor that is out of phase with magnets in the generator.

6. The method of claim 1, wherein disabling the generator includes opening switches that control power distribution to the generator.

7. A system for controlling a powertrain of a vehicle, comprising:
    an engine;
    a planetary gear set having a ring gear and coupled to the engine for distributing torque to traction wheels in a first mode of operation;
    a generator coupled to the planetary gear set;
    a fraction motor electrically connected to the generator for providing power to the traction wheels in a second mode of operation in which the engine is disabled; and
    a system controller that disables at least one of the engine and the generator based upon:
        in the first mode of operation, engine acceleration being greater than an expected engine acceleration, and a difference between engine speed and ring gear speed being less than a first threshold, and in the second mode of operation, a difference between generator speed and an expected generator speed exceeding a second threshold.

8. The system of claim 7, wherein the system controller disables the generator in the first mode of operation based upon:
   a difference between the engine speed and a target engine speed exceeding a third threshold, and
   generator torque exceeding a fourth threshold.

9. The system of claim 7, wherein the controller prevents fuel from entering combustion chambers of the engine.

10. The system of claim 7, wherein the controller disables the generator by applying a voltage to a rotor that is out of phase with magnets in the rotor.

11. The system of claim 7, wherein the system controller disables the generator, and disabling the generator includes opening switches that control power distribution to the generator.

12. The system of claim 7, wherein the traction motor provides power to the traction wheels upon the disabling of one of the engine and the generator.

13. The system of claim 7, wherein the traction motor provides power to the traction wheels in the first mode of operation.

* * * * *

UNITED STATES PATENT AND TRADEMARK OFFICE
CERTIFICATE OF CORRECTION

PATENT NO. : 8,535,201 B2  Page 1 of 1
APPLICATION NO. : 13/242691
DATED : September 17, 2013
INVENTOR(S) : Ming Lang Kuang et al.

It is certified that error appears in the above-identified patent and that said Letters Patent is hereby corrected as shown below:

In the Claims

Column 8, Line 25, Claim 1:
Delete "fraction" and insert -- traction --.

Column 8, Line 59, Claim 7:
Delete "fraction" and insert -- traction --.

Signed and Sealed this
Tenth Day of December, 2013

Margaret A. Focarino
*Commissioner for Patents of the United States Patent and Trademark Office*